US010030355B2

(12) United States Patent
Yamashita et al.

(10) Patent No.: US 10,030,355 B2
(45) Date of Patent: Jul. 24, 2018

(54) HYDRAULIC CONTROL SYSTEM FOR CONSTRUCTION MACHINE

(71) Applicant: HITACHI CONSTRUCTION MACHINERY CO., LTD., Tokyo (JP)

(72) Inventors: Ryouhei Yamashita, Tsuchiura (JP); Shinya Imura, Toride (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/375,199

(22) Filed: Dec. 12, 2016

(65) Prior Publication Data

US 2017/0183842 A1 Jun. 29, 2017

(30) Foreign Application Priority Data

Dec. 25, 2015 (JP) ................................ 2015-255225

(51) Int. Cl.
*G06F 7/70* (2006.01)
*G06F 19/00* (2018.01)
(Continued)

(52) U.S. Cl.
CPC ................ *E02F 3/435* (2013.01); *E02F 3/32* (2013.01); *E02F 3/425* (2013.01); *E02F 3/963* (2013.01);
(Continued)

(58) Field of Classification Search
CPC .................................... E02F 3/435; E02F 3/32
See application file for complete search history.

(56) References Cited

U.S. PATENT DOCUMENTS

2011/0318157 A1* 12/2011 Okamura .............. E02F 9/2207 414/687
2016/0215475 A1* 7/2016 Meguriya ................ E02F 3/32
(Continued)

FOREIGN PATENT DOCUMENTS

JP 2012-036665 A 2/2012
JP 2012-172382 A 9/2012
(Continued)

OTHER PUBLICATIONS

Extended European Search Report received in corresponding European Application No. 16203523.2 dated May 19, 2017.

*Primary Examiner* — Imran Mustafa
(74) *Attorney, Agent, or Firm* — Mattingly & Malur, PC

(57) ABSTRACT

A hydraulic control system for a construction machine has a hydraulic actuator that drives an arm, a meter-out channel through which hydraulic fluid discharged from the hydraulic actuator flows, a variable restrictor provided in the meter-out channel, an operating device, and a controller that controls an opening area of the variable restrictor. A posture calculation unit calculates an angle made by the arm with respect to a horizontal direction, a meter-out opening area calculation unit calculates the opening area of the variable restrictor based on the angle made by the arm with respect to the horizontal direction and a time rate of change of the angle, and a meter-out control unit outputs a command signal to a solenoid valve used for adjusting the opening area of the variable restrictor, based on the opening area of the variable restrictor calculated by the meter-out opening area calculation unit.

4 Claims, 9 Drawing Sheets

(51) Int. Cl.

| | |
|---|---|
| ***G06G 7/00*** | (2006.01) |
| ***G06G 7/76*** | (2006.01) |
| ***E02F 3/43*** | (2006.01) |
| ***E02F 3/32*** | (2006.01) |
| ***E02F 3/42*** | (2006.01) |
| ***E02F 9/22*** | (2006.01) |
| ***F15B 11/08*** | (2006.01) |
| ***F15B 13/04*** | (2006.01) |
| ***F15B 13/044*** | (2006.01) |
| ***E02F 3/96*** | (2006.01) |
| ***E02F 9/26*** | (2006.01) |

(52) U.S. Cl.

CPC ............ *E02F 9/2203* (2013.01); *E02F 9/226* (2013.01); *E02F 9/2221* (2013.01); *E02F 9/2271* (2013.01); *E02F 9/2282* (2013.01); *E02F 9/2285* (2013.01); *E02F 9/265* (2013.01); *F15B 11/08* (2013.01); *F15B 13/0401* (2013.01); *F15B 13/044* (2013.01); *E02F 9/2296* (2013.01); *F15B 2211/20546* (2013.01); *F15B 2211/40515* (2013.01)

(56) References Cited

U.S. PATENT DOCUMENTS

| | | | |
|---|---|---|---|
| 2016/0251824 | A1 | 9/2016 | Arimatsu et al. |
| 2016/0251835 | A1 | 9/2016 | Kitajima et al. |

FOREIGN PATENT DOCUMENTS

| | | | |
|---|---|---|---|
| WO | 2015/151328 | A1 | 10/2015 |
| WO | 2015/186180 | A1 | 12/2015 |
| WO | 2015/186201 | A1 | 12/2015 |

* cited by examiner

HYDRAULIC CONTROL SYSTEM FOR CONSTRUCTION MACHINE

BACKGROUND OF THE INVENTION

Field of the Invention

The present invention relates to a hydraulic control system for a construction machine.

Description of the Related Art

A hydraulic control system for a construction machine such as a hydraulic excavator generally comprises a hydraulic pump, hydraulic actuators driven by hydraulic fluid delivered from the hydraulic pump, and control valves for controlling the supply and discharge of the hydraulic fluid to/from the hydraulic actuators. For example, the hydraulic actuators of a hydraulic excavator include a boom cylinder, an arm cylinder and a bucket cylinder for respectively driving a boom, an arm and a bucket of a front work implement. Each hydraulic actuator is provided with a corresponding control valve.

Each of these control valves has a meter-in restrictor and a meter-out restrictor. The flow rate of the hydraulic fluid supplied from the hydraulic pump to the hydraulic actuator is controlled by the meter-in restrictor, while the flow rate of the hydraulic fluid discharged from the hydraulic actuator to a tank is controlled by the meter-out restrictor.

Incidentally, attachments that can be attached to the front work implement include not only a standard bucket but also a large-sized bucket, a crusher, a pulverizer, etc. Many of these attachments are heavier than the standard bucket. Thus, if an opening area of the meter-out restrictor is adjusted in the development phase assuming the state in which the standard bucket is attached to the front work implement, the following problems arise when the user attaches a heavyweight attachment to the front work implement instead of the standard bucket:

When the arm equipped with an attachment is pulled in the air, that is, crowded, a load is placed on the arm cylinder due to the weight of the arm and the attachment as a load in the same direction as the expanding direction of the arm cylinder (hereinafter referred to as a negative load). When a heavyweight attachment is attached to the front work implement, this negative load increases in comparison with the state in which the standard bucket is attached. Therefore, it is presumed that the operating speed of the arm cylinder increases in comparison with the state in which the standard bucket is attached and a breathing phenomenon (cavitation) occurs due to an insufficient flow rate of the hydraulic fluid on the meter-in side. As a result, the operability of the construction machine deteriorates. Incidentally, the breathing phenomenon can cause damage to the hydraulic actuators and the control valves.

To prevent the occurrence of such problems, the opening area of the meter-out restrictor is usually adjusted assuming the state in which a heavyweight attachment is attached. However, when work is performed by attaching the standard bucket to such a construction machine whose meter-out restrictor opening area has been adjusted as above, meter-out pressure loss greater than that necessary for supporting the negative load due to the weight of the arm and the standard bucket occurs on the meter-out side and that leads to energy loss of the construction machine.

To resolve this problem, there exists a hydraulic circuit that is provided with pressure-reducing means for reducing pilot pressure acting on a pilot pressure receiving part on the arm cylinder expansion side of the arm flow control valve depending on the pressure of the hydraulic fluid supplied to the arm cylinder and is configured to regulate the spool stroke of the arm flow control valve and thereby reduce the opening area of the meter-out restrictor when the arm crowding operation is performed in the air (see JP-2012-36665-A, for example).

SUMMARY OF THE INVENTION

In the above-described hydraulic circuit, when the expansion speed of the arm cylinder rises and the pressure on the meter-in side of the arm flow control valve drops, the opening area of the meter-out restrictor is reduced by decreasing the pilot pressure acting on the pilot pressure receiving part on the arm cylinder expansion side. With this operation, the pressure on the meter-out side is increased. Consequently, the expansion speed of the arm cylinder decreases.

However, since the above-described hydraulic circuit performs the so-called on-off control based on the comparison between the actual pressure on the meter-in side and a preset pressure, the following problem can arise: If the expansion speed of the arm cylinder is decreased by reducing the opening area of the meter-out restrictor, the pressure on the meter-in side rises accordingly, by which the pressure reducing control for reducing the pilot pressure acting on the pilot pressure receiving part on the arm cylinder expansion side is canceled. Accordingly, the expansion speed of the arm cylinder rises again. Repetition of such operations causes deterioration in the operability.

Further, the pressure in the rod-side hydraulic chamber necessary for supporting the negative load, that is, the meter-out pressure loss, changes depending not only on the weight of the arm and the attachment but also on the posture of the arm. For example, in cases where the crowding operation is performed by pulling the arm in the air from an angle approximately parallel to the ground surface to the vertical position, high pressure in the rod-side hydraulic chamber is necessary for supporting the negative load just after the start of the expansion of the arm cylinder, that is, when the arm angle is approximately horizontal. In contrast, when the arm cylinder has expanded and the arm angle is approximately vertical, the negative load can be supported with lower pressure in the rod-side hydraulic chamber in comparison with the case just after the start of the expansion of the arm cylinder.

The object of the present invention, which has been made in consideration of the above-described situation, is to provide a hydraulic control system for a construction machine capable of preventing the deterioration in the operability even when the negative load acting on the hydraulic actuator changes and achieving significant energy saving effect.

To resolve the above-described problem, configurations described in claims are employed, for example. While the present application contains multiple means for resolving the above-described problem, an example of the means is as follows: A hydraulic control system for a construction machine comprises a hydraulic actuator that drives an arm with hydraulic fluid delivered from a hydraulic pump, a meter-out channel through which the hydraulic fluid discharged from the hydraulic actuator flows, a variable restrictor provided in the meter-out channel, an operating device that outputs an operation command signal for the hydraulic actuator according to an operation amount of the operating device, and a controller that controls an opening area of the variable restrictor. The controller includes a posture calculation unit that calculates an angle made by the arm with respect to a horizontal direction, a meter-out opening area calculation unit that calculates the opening area of the variable restrictor provided in the meter-out channel based on the angle made by the arm with respect to the horizontal direction calculated by the posture calculation unit and based on a time rate of change of the angle, and a meter-out control unit that outputs a command signal to a solenoid valve used for adjusting the opening area of the variable restrictor, based on the opening area of the variable restrictor calculated by the meter-out opening area calculation unit.

According to the present invention, the angle made by the arm or the bucket with respect to the horizontal direction is detected and the opening area of the meter-out restrictor is controlled according to the time rate of change of the angle. Therefore, the deterioration in the operability is prevented even when the negative load acting on the hydraulic actuator changes and significant energy saving effect is achieved.

DESCRIPTION OF THE PREFERRED EMBODIMENTS

Embodiments of the present invention will be described below with reference to figures by taking a hydraulic excavator as an example of the construction machine.

First Embodiment

Figure 1:
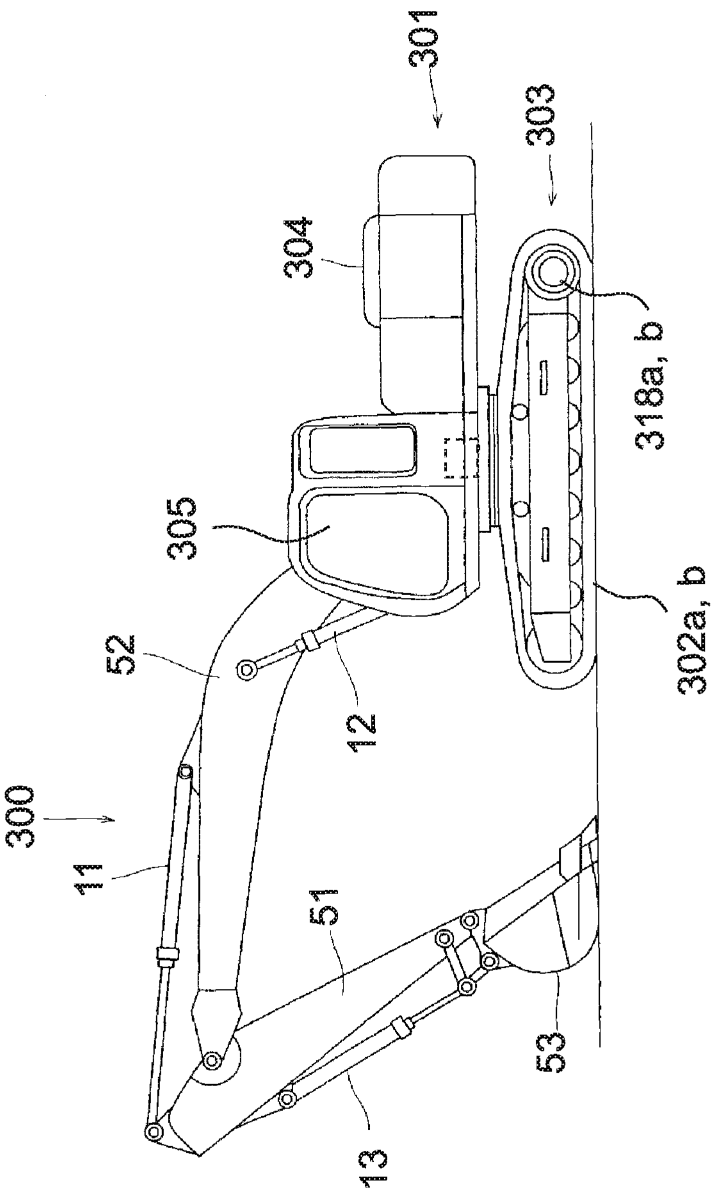
FIG. 1 is a side view showing a hydraulic excavator equipped with a hydraulic control system for a construction machine according to a first embodiment of the present invention.

FIG. 1 is a side view showing a hydraulic excavator equipped with a hydraulic control system for a construction machine according to a first embodiment of the present invention.

In FIG. 1, a hydraulic excavator 301 comprises a lower track structure 303 having a pair of left and right crawlers 302*a* and 302*b*, an upper swing structure 304 swingably provided on the lower track structure 303, and a front work implement 300 of the multijoint type whose one end is connected to the upper swing structure 304.

Travel hydraulic motors 318*a* and 318*b* for driving the crawlers 302*a* and 302*b* are mounted on the lower track structure 303. A cab 305 housing a control lever (operating device) 36 (see FIG. 2) is arranged on a left front part of the upper swing structure 304. The front work implement 300 is attached to the center of the front of the upper swing structure 304.

The front work implement 300 includes a boom 52 attached to a boom foot (unshown) provided at the center of the front of the upper swing structure 304 to be freely pivotable up and down, an arm 51 attached to the tip end of the boom 52 to be freely pivotable in the longitudinal direction, and a bucket 53 as a work tool (attachment) attached to the tip end of the arm 51 to be freely rotatable up and down.

The front work implement 300 further includes a boom cylinder 12 as a hydraulic actuator connected to the boom foot and the boom 52 to pivot the boom 52 in the vertical direction, an arm cylinder 11 as a hydraulic actuator connected to the boom 52 and the arm 51 to pivot the arm 51 in the vertical direction, and a bucket cylinder 13 as a hydraulic actuator connected to the arm 51 and the bucket 53 to rotate the work tool 53 in the vertical direction. In short, the front work implement 300 is driven by these hydraulic actuators 11, 12 and 13.

Figure 2:
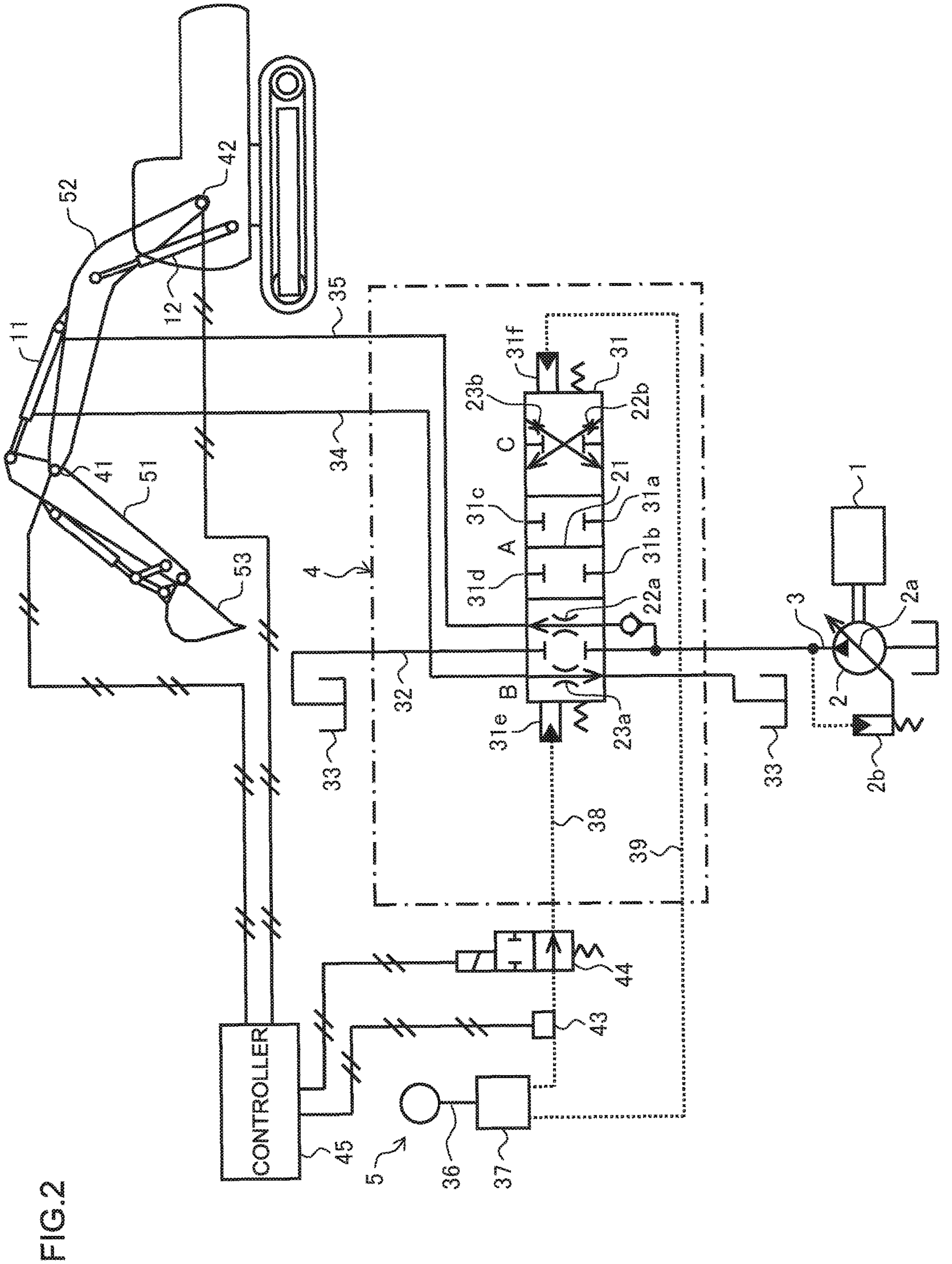
FIG. 2 is a diagram schematically showing a hydraulic circuit part related to an arm cylinder of the hydraulic excavator in the first embodiment of the hydraulic control system for a construction machine according to the present invention.

FIG. 2 is a diagram schematically showing a hydraulic circuit part related to the arm cylinder 11 of the hydraulic excavator in the first embodiment of the hydraulic control system for a construction machine according to the present invention. In FIG. 2, the hydraulic control system according to this embodiment comprises a prime mover 1, a hydraulic pump 2 driven by the prime mover 1, a valve unit 4 connected to a delivery line 3 of the hydraulic pump 2 and having an arm flow control valve 31 for controlling the flow rate and the direction of the hydraulic fluid supplied to the arm cylinder 11, and a pilot valve 5 as an arm control lever device.

The hydraulic pump 2 is a hydraulic pump of the variable displacement type having a displacement varying member such as a swash plate 2*a*. The swash plate 2*a* is controlled by a horsepower control actuator 2*b* to decrease the displacement with the increase in the delivery pressure of the hydraulic pump 2.

The flow control valve 31 is a center bypass valve whose center bypass part 21 is situated in a center bypass line 32. The upstream side of the center bypass line 32 is connected to the delivery line 3 of the hydraulic pump 2, while the downstream side of the center bypass line 32 is connected to a tank 33. The flow control valve 31 has a pump port 31*a*, a tank port 31*b* and actuator ports 31*c* and 31*d*. The pump port 31*a* is connected to the center bypass line 32. The tank port 31*b* is connected to the tank 33. The actuator ports 31*c* and 31*d* are respectively connected to a bottom-side hydraulic chamber and a rod-side hydraulic chamber of the arm cylinder 11 via actuator lines 35 and 34.

The pilot valve 5 is equipped with the control lever 36 and a pilot pressure generating unit 37 including a pair of pressure reducing valves (unshown). The pilot pressure generating unit 37 is connected to pilot pressure receiving parts 31*e* and 31*f* of the flow control valve 31 via pilot lines 38 and 39. When the control lever 36 is operated, the pilot pressure generating unit 37 actuates one of the pair of pressure reducing valves depending on the direction of the operation on the control lever 36 and outputs pilot pressure corresponding to the operation amount of the control lever 36 to one of the pilot lines 38 and 39.

Here, the flow control valve 31 has a neutral position A and switch positions B and C. When the pilot pressure is applied from the pilot line 38 to the pressure receiving part 31*e*, the flow control valve 31 is switched to the switch position B on the left side in FIG. 2. In this case, the actuator line 35 works as the meter-in side and the actuator line 34 works as the meter-out side, the hydraulic fluid is supplied to the bottom-side hydraulic chamber of the arm cylinder 11, and the piston rod of the arm cylinder 11 expands.

Conversely, when the pilot pressure is applied from the pilot line 39 to the pressure receiving part 31*f*, the flow control valve 31 is switched to the switch position C on the right side in FIG. 2. In this case, the actuator line 34 works as the meter-in side and the actuator line 35 works as the meter-out side, the hydraulic fluid is supplied to the rod-side hydraulic chamber of the arm cylinder 11, and the piston rod of the arm cylinder 11 contracts. The expansion of the piston rod of the arm cylinder 11 corresponds to an arm crowding operation, while the contraction of the piston rod of the arm cylinder 11 corresponds to an arm damping operation.

The flow control valve 31 further has meter-in restrictors 22*a* and 22*b* and meter-out restrictors 23*a* and 23*b*. When the flow control valve 31 is at the switch position B, the flow rate of the hydraulic fluid supplied to the arm cylinder 11 is controlled by the meter-in restrictor 22*a* and the flow rate of the hydraulic fluid returning from the arm cylinder 11 is controlled by the meter-out restrictor 23*a*. In contrast, when the flow control valve 31 is at the switch position C, the flow rate of the hydraulic fluid supplied to the arm cylinder 11 is controlled by the meter-in restrictor 22*b* and the flow rate of the hydraulic fluid returning from the arm cylinder 11 is controlled by the meter-out restrictor 23*b*.

Figure 3:
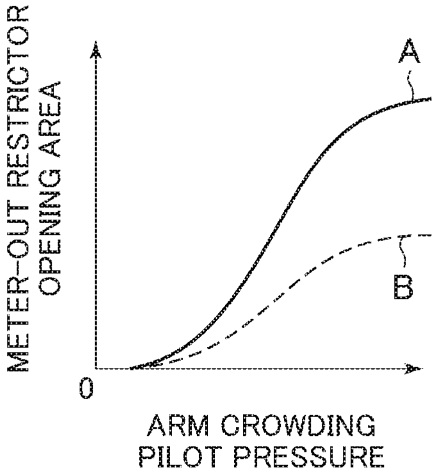
FIG. 3 is a characteristic diagram showing opening area characteristics of a meter-out restrictor 23*a* in the first embodiment of the hydraulic control system for a construction machine according to the present invention.

FIG. 3 is a characteristic diagram showing opening area characteristics of the meter-out restrictor 23*a* in the first embodiment of the hydraulic control system for a construction machine according to the present invention. Specifically, FIG. 3 shows the opening area characteristics of the meter-out restrictor 23*a* with respect to the pilot pressure acting on the pressure receiving part 31*e*, that is, arm crowding pilot pressure. In FIG. 3, the solid line A represents the opening area characteristics in this embodiment, while the broken line B represents the opening area characteristics in a conventional example. When the supplied arm crowding pilot pressure is the same, the opening area in this embodiment is set larger than the opening area in the conventional example.

Returning to FIG. 2, the pilot line 38 is provided with a pressure sensor 43 for detecting the arm crowding pilot pressure outputted from the pilot valve 5 and a solenoid proportional valve 44 for adjusting the arm crowding pilot pressure outputted from the pilot valve 5 and supplying the adjusted pressure to the pressure receiving part 31*e*. An arm crowding pilot pressure signal outputted from the pressure sensor 43 detecting the arm crowding pilot pressure is inputted to a controller 45 which will be explained later. A command signal is outputted from the controller 45 to the solenoid proportional valve 44.

A base end part of the boom 52 supported by the upper swing structure 304 is provided with a boom angle sensor 42 for detecting the rotation angle of the boom 52. A tip end part of the boom 52 rotatably supporting one end of the arm 51 is provided with an arm angle sensor 41 for detecting the rotation angle of the arm 51. Rotation angle signals outputted from these angle sensors 42 and 41 detecting the rotation angles are inputted to the controller 45.

The hydraulic control system in this embodiment comprises, as its characteristic configuration, the arm angle sensor 41 for detecting the rotation angle of the arm 51, the boom angle sensor 42 for detecting the rotation angle of the boom 52, the pressure sensor 43 for detecting the arm crowding pilot pressure outputted from the pilot valve 5, the solenoid proportional valve 44 arranged in the pilot line 38, and the controller 45 receiving the detection signals from the arm angle sensor 41, the boom angle sensor 42 and the pressure sensor 43, performing a prescribed calculation process, and outputting a command current to the solenoid proportional valve 44.

Figure 4:
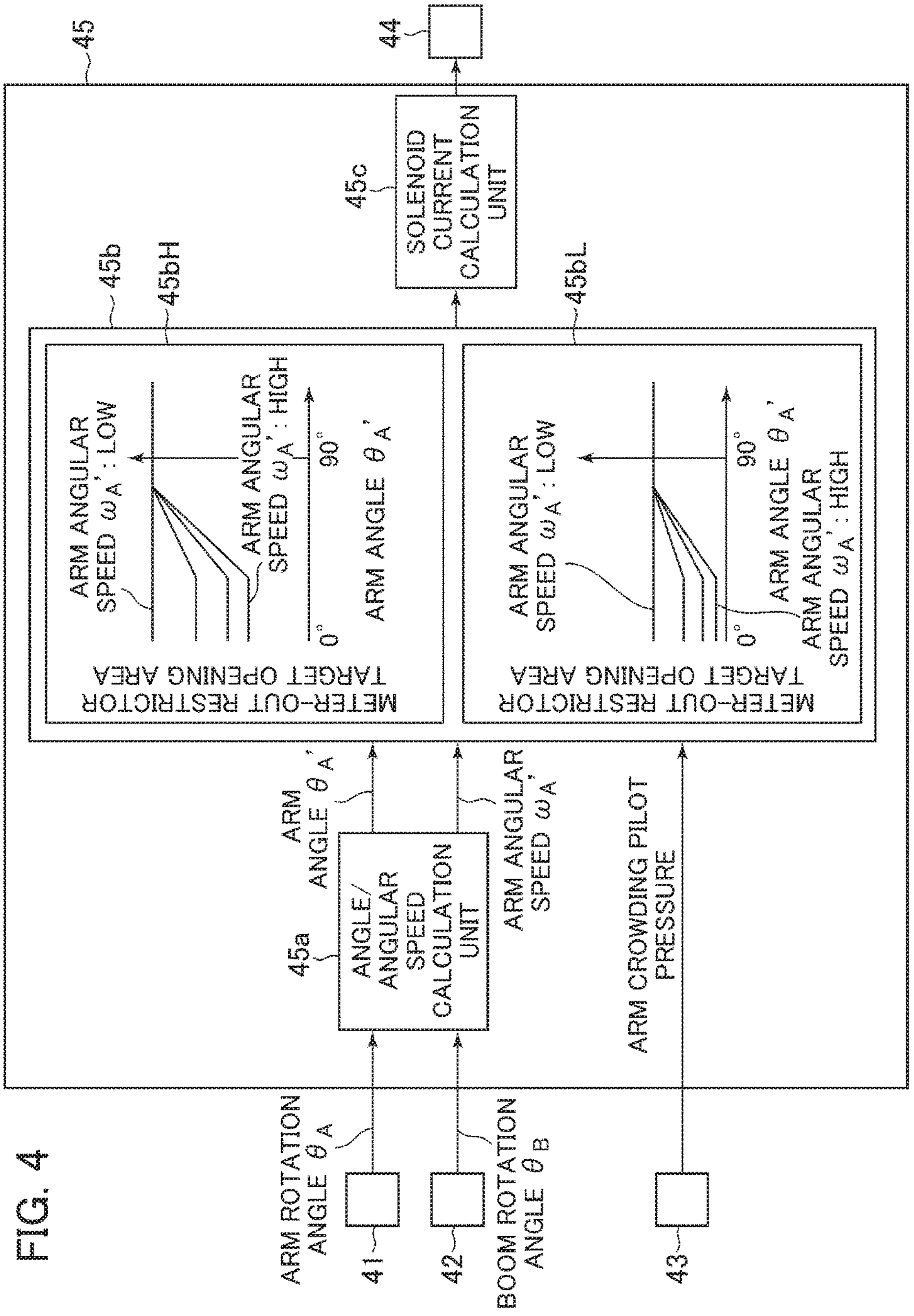
FIG. 4 is a functional block diagram showing the processing function of a controller constituting the first embodiment of the hydraulic control system for a construction machine according to the present invention.
Figure 5:
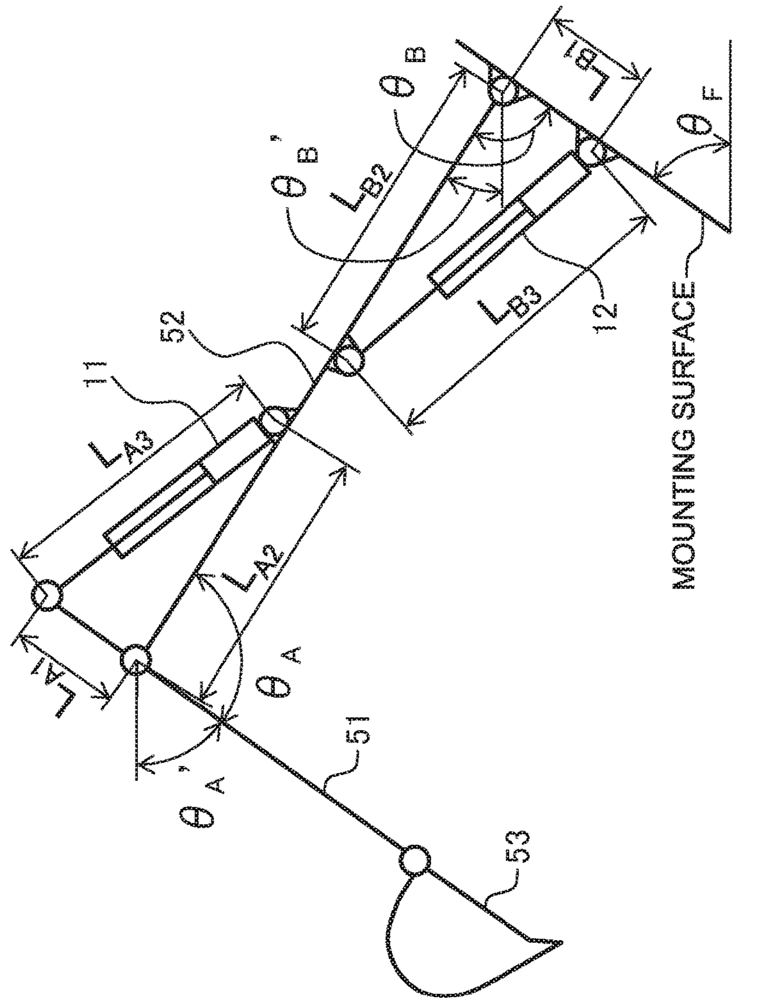
FIG. 5 is a diagram schematically showing a front work implement of the hydraulic excavator equipped with the hydraulic control system for a construction machine according to the first embodiment of the present invention.

Next, the contents of the processing by the controller in this embodiment will be explained below with reference to FIGS. 4 and 5. FIG. 4 is a functional block diagram showing the processing function of the controller constituting the first embodiment of the hydraulic control system for a construction machine according to the present invention. FIG. 5 is a diagram schematically showing the front work implement of the hydraulic excavator equipped with the hydraulic control system for a construction machine according to the first embodiment of the present invention. Reference characters in FIGS. 4 and 5 identical with those in FIGS. 1 to 3 represent components identical with those in FIGS. 1 to 3, and thus detailed explanation thereof is omitted here.

Prior to the explanation of the controller 45, angles of the boom 52, the arm 51, etc. constituting the front work implement and lengths of components in this embodiment are defined as shown in FIG. 5. In FIG. 5, $\theta_A$ represents the rotation angle of the arm 51, which is defined as the angle made by the arm 51 with respect to the boom 52. $\theta_A'$ represents the angle made by the arm 51 with respect to a horizontal direction. $\theta_B$ represents the rotation angle of the boom 52, which is defined as the angle made by the boom 52 with respect to a boom mounting surface. $\theta_B'$ represents the angle made by the boom 52 with respect to the horizontal direction. $\theta_F$ represents the angle made by the mounting surface for the boom 52 and the boom cylinder 12 with respect to a horizontal direction.

The lengths of the components are defined as follows: $L_{A1}$ represents the distance from the rotation center of the arm 51 to a joint part between the arm 51 and the tip end of the arm cylinder 11. $L_{A2}$ represents the distance from the rotation center of the arm 51 to a joint part between the boom 52 and the base end of the arm cylinder 11. $L_{A3}$ represents the total length of the arm cylinder 11, which is defined as the distance from the joint part between the boom 52 and the base end of the arm cylinder 11 to the tip end of the arm cylinder 11. Similarly, $L_{B1}$ represents the distance from the rotation center of the boom 52 to a joint part between the base end of the boom cylinder 12 and the mounting surface. $L_{B2}$ represents the distance from the rotation center of the boom 52 to a joint part between the boom 52 and the tip end of the boom cylinder 12. $L_{B3}$ represents the total length of the boom cylinder 12, which is defined as the distance from the joint part between the base end of the boom cylinder 12 and the mounting surface to the joint part between the boom 52 and the tip end of the boom cylinder 12.

Returning to FIG. 4, the controller 45 includes an angle/angular speed calculation unit 45*a* as a posture calculation unit, a meter-out opening calculation unit 45*b* as a meter-out opening area calculation unit, and a solenoid current calculation unit 45*c* as a meter-out control unit.

The angle/angular speed calculation unit 45*a* receives a signal representing the rotation angle $\theta_A$ of the arm 51 detected by the arm angle sensor 41 and a signal representing the rotation angle $\theta_B$ of the boom 52 detected by the boom angle sensor 42 and calculates the angle $\theta_A'$ made by the arm 51 with respect to the horizontal direction (hereinafter referred to also as an "arm angle") and the angular speed $\omega_A'$ of the rotation of the arm 51 (hereinafter referred to also as an "arm angular speed") from the values of the signals.

Specifically, the arm angle $\theta_A'$ and the arm angular speed $\omega_A'$ are calculated by using the following expressions:

$$\theta'_A = 180° - \theta_A - \theta'_B \quad (1)$$
$$= 180° - \theta_A - \theta_B + \theta_F$$

$$\omega'_A = \{\theta'_A(t+\Delta t) - \theta'_A(t)\}/\Delta t \quad (2)$$

where t represents the time from the start of the calculation and Δt represents the time step of the calculation.

The meter-out opening calculation unit 45*b* receives signals representing the arm angle $\theta_A'$ and the arm angular speed $\omega_A'$ calculated by the angle/angular speed calculation unit 45*a*, receives a signal representing the arm crowding pilot pressure detected by the pressure sensor 43 as an operation amount signal from the operating device, and calculates a target opening area of the meter-out restrictor 23*a* corresponding to the arm angle $\theta_A'$, the arm angular speed $\omega_A'$ and the arm crowding pilot pressure by using tables shown in FIG. 4. A signal representing the calculated target opening area of the meter-out restrictor 23*a* is outputted to the solenoid current calculation unit 45*c*.

Incidentally, the meter-out opening calculation unit 45*b* has two tables 45*b*H and 45*b*L in this example. A prescribed arm crowding pilot pressure is set previously and the meter-out opening calculation unit 45*b* is configured to select the table 45*b*H when the inputted arm crowding pilot pressure is higher than or equal to the set value and to select the table 45*b*L otherwise. The two tables 45*b*H and 45*b*L differ from each other in characteristics of the meter-out restrictor target opening area with respect to the arm angle $\theta_A'$. Specifically, the two tables 45*b*H and 45*b*L differ from each other in the upper limit and the lower limit.

In both of the tables of the meter-out opening calculation unit 45*b*, the characteristics are set so as to decrease the target opening area of the meter-out restrictor 23*a* with the increase in the arm angular speed $\omega_A'$ when the arm angle $\theta_A'$ is less than or equal to approximately 90°, that is, when a negative load acts on the arm cylinder 11, and to set the target opening area of the meter-out restrictor 23*a* at a maximum value irrespective of the arm angular speed $\omega_A'$ when the arm angle $\theta_A'$ is larger than or equal to approximately 90°, that is, when a positive load acts on the arm cylinder 11. While the selection is made from different tables based on the arm crowding pilot pressure as the operation amount signal from the operating device as explained above, the number of the tables is not limited to two; the meter-out opening calculation unit 45*b* may also have a greater number of tables to make a finer selection depending on the arm crowding pilot pressure.

The solenoid current calculation unit 45*c* receives a signal representing the target opening area of the meter-out restrictor 23*a* calculated by the meter-out opening calculation unit 45*b*, calculates a solenoid current value corresponding to the value of the received signal, and outputs a control signal representing the calculated solenoid current value to the solenoid proportional valve 44.

Figure 6:
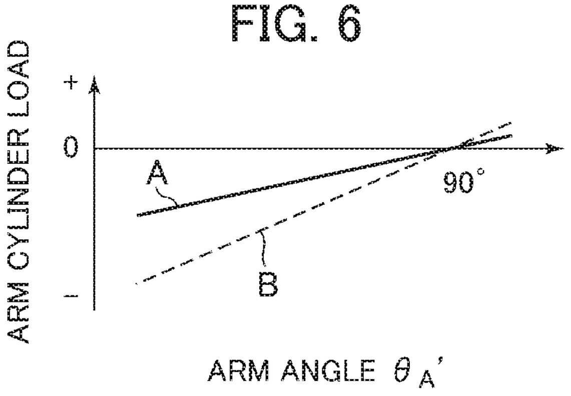
FIG. 6 is a characteristic diagram showing the relationship between an arm angle and a load acting on the arm cylinder when the arm is crowded in the air from an angle approximately parallel to the ground surface to the vertical position in the first embodiment of the hydraulic control system for a construction machine according to the present invention.
Figure 7:
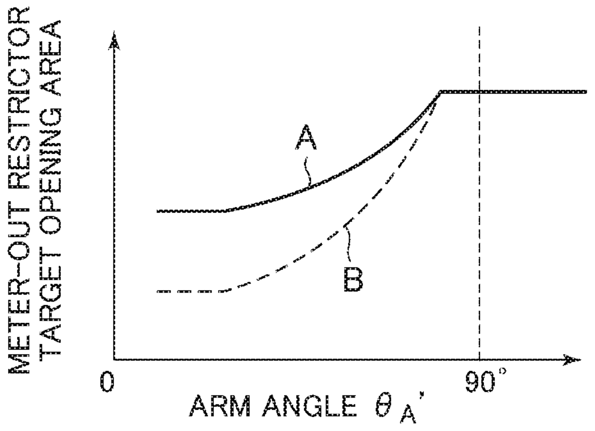
FIG. 7 is a characteristic diagram showing the relationship between the arm angle and a target opening area of the meter-out restrictor 23*a* when the arm is crowded in the air from an angle approximately parallel to the ground surface to the vertical position in the first embodiment of the hydraulic control system for a construction machine according to the present invention.
Figure 10:
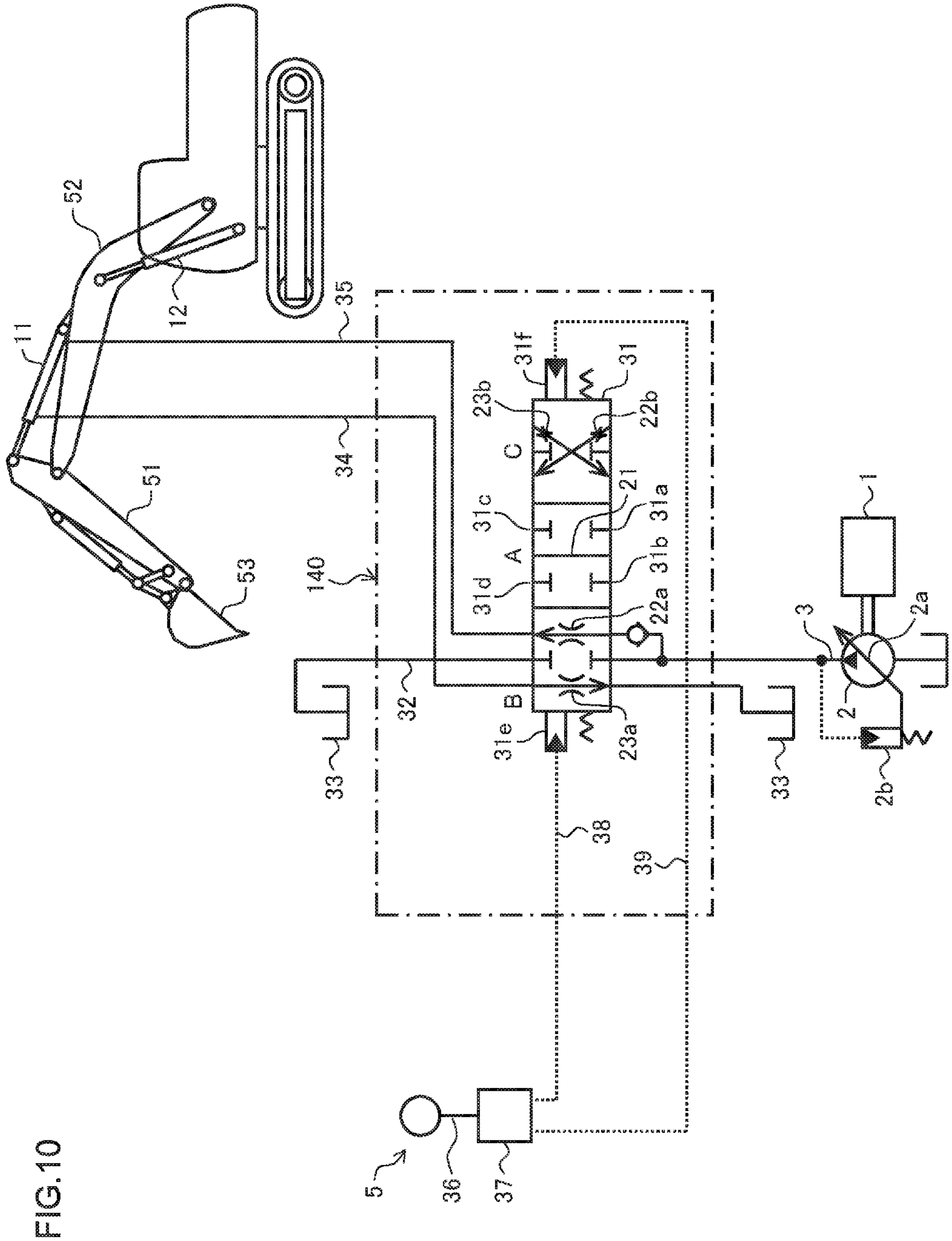
FIG. 10 is a diagram schematically showing a hydraulic circuit part related to the arm cylinder of a hydraulic excavator in a conventional hydraulic control system for a construction machine.

Next, the operation of the hydraulic control system for a construction machine according to the first embodiment of the present invention will be described below with reference to FIGS. 6, 7 and 10 in contrast with a conventional example. FIG. 6 is a characteristic diagram showing the relationship between the arm angle and the load acting on the arm cylinder when the arm is crowded in the air from an angle approximately parallel to the ground surface to the vertical position in the first embodiment of the hydraulic control system for a construction machine according to the present invention. FIG. 7 is a characteristic diagram showing the relationship between the arm angle and the target opening area of the meter-out restrictor 23*a* when the arm is crowded in the air from an angle approximately parallel to the ground surface to the vertical position in the first embodiment of the hydraulic control system for a construction machine according to the present invention. FIG. 10 is a diagram schematically showing a hydraulic circuit part related to the arm cylinder of a hydraulic excavator in a conventional hydraulic control system for a construction machine. Reference characters in FIGS. 6, 7 and 10 identical with those in FIGS. 1 to 5 represent components identical with those in FIGS. 1 to 5, and thus detailed explanation thereof is omitted here.

In comparison with the hydraulic control system in this embodiment, the conventional hydraulic control system shown in FIG. 10 is not provided with the arm angle sensor 41, the boom angle sensor 42, the pressure sensor 43, the solenoid proportional valve 44 or the controller 45.

In the conventional hydraulic control system, the flow control valve 31 for the arm 51 is switched to the position B in FIG. 10 to crowd the arm 51 above the ground, that is, in the air. In this case, the flow control valve 31 controls the hydraulic fluid returning from the arm cylinder 11 by using the meter-out restrictor 23*a* and thereby controls the speed of the arm cylinder 11 while preventing the breathing phenomenon (cavitation) due to a free fall of the arm 51.

In other words, by throttling the meter-out side, the pressure in the rod-side hydraulic chamber of the arm cylinder 11 is raised and thrust necessary for resisting the negative load due to the weight of the arm 51 and the attachment 53 is generated. Accordingly, even when a heavyweight attachment 53 is attached to the arm 51, the speed of the arm cylinder 11 does not increase in comparison with the state in which the standard bucket is attached, and the breathing phenomenon does not occur.

However, when work is performed by attaching the standard bucket to the arm 51, the pressure in the rod-side hydraulic chamber of the arm cylinder 11 is high relative to the negative load due to the weight of the arm 51 and the attachment 53. Thus, in order to make the thrust of the arm cylinder 11 comparable to the load, the pressure in the bottom-side hydraulic chamber of the arm cylinder 11 has to be raised by supplying the hydraulic fluid from the hydraulic pump 2 to the bottom-side hydraulic chamber. This process causes energy loss.

In contrast to the above-described conventional technology, the hydraulic control system in this embodiment operates as follows: In FIG. 6 showing the relationship between the arm angle $\theta_A'$ and the load acting on the arm cylinder 11 when the arm 51 is crowded in the air from an angle approximately parallel to the ground surface to the vertical position in this embodiment, the arm angle represented by the horizontal axis means the angle of the arm 51 with respect to a horizontal plane. The arm angle in a state in which the arm 51 is held in the air in parallel with the ground surface is defined as 0 degrees. The arm angle when the arm cylinder 11 has been expanded from this state and the arm 51 has been rotated counterclockwise in FIG. 1 and is held orthogonally to a horizontal plane is defined as 90 degrees. In FIG. 6, the solid line A indicates the characteristics of the load acting on the arm cylinder 11 with respect to the arm angle $\theta_A'$ when the standard bucket is attached as the attachment 53, while the broken line B indicates the characteristics of the load acting on the arm cylinder 11 with respect to the arm angle $\theta_A'$ when the a heavyweight attachment heavier than the standard bucket is attached.

In either case, the maximum value of the absolute value of the negative load due to the weight of the arm 51 and the attachment 53 acts on the arm cylinder 11 when the arm angle $\theta_A'$ is close to 0 degrees. However, the absolute value of the negative load becomes larger when the heavyweight attachment is attached. In either case, the absolute value of the negative load decreases with the increase in the arm angle $\theta_A'$ and the load turns positive when the arm angle $\theta_A'$ is approximately 90 degrees.

FIG. 7 shows the relationship between the arm angle $\theta_A'$ and the target opening area of the meter-out restrictor 23*a* calculated by the meter-out opening calculation unit 45*b* of the controller 45 in this case. In FIG. 7, the solid line A indicates the target opening area of the meter-out restrictor 23*a* when the standard bucket is attached as the attachment 53, while the broken line B indicates the target opening area of the meter-out restrictor 23*a* when an attachment 53 heavier than the standard bucket is attached.

In either case, the meter-out restrictor target opening area is reduced to a minimum value when the arm angle $\theta_A'$ is close to 0 degrees. The meter-out opening calculation unit 45*b* has been given a feature to decrease the target opening area of the meter-out restrictor 23*a* with the increase in the absolute value of the negative load, that is, with the increase in the arm angular speed $\omega_A'$. Thus, the meter-out restrictor target opening area becomes smaller when the heavyweight attachment 53 is attached. With the increase in the arm angle $\theta_A'$, the meter-out restrictor target opening area also increases and reaches the maximum value when the arm angle $\theta_A'$ is approximately 90 degrees.

In the conventional hydraulic control system, the opening area of the meter-out restrictor 23*a* is constant at the opening area corresponding to the minimum value of the broken line B in FIG. 7. In this embodiment, the opening area of the meter-out restrictor 23*a* is changed depending on the arm angle $\theta_A'$ and the arm angular speed $\omega_A'$ as the time rate of change of the arm angle $\theta_A'$. Therefore, the meter-out pressure loss is reduced and the energy loss is also reduced in comparison with the conventional example. Further, since the above-described operation adjusts the upper limit and the lower limit depending on the arm crowding pilot pressure, the energy loss reduction effect is achieved irrespective of the operation amount of the control lever.

Incidentally, while the above description of this embodiment has been given by using an example of application of the present invention to the valve unit of the arm cylinder of a hydraulic excavator, the present invention is not limited to such examples. For example, the present invention is applicable also to the valve unit of the bucket cylinder performing the bucket crowding operation. In this case, the hydraulic circuit part shown in FIG. 2 may be employed by replacing the arm cylinder with the bucket cylinder, replacing the arm flow control valve with the bucket flow control valve, and replacing the arm control lever device with the bucket control lever device, for example.

According to the above-described first embodiment of the hydraulic control system for a construction machine according to the present invention, the angle made by the arm or the bucket with respect to the horizontal direction is detected and the opening area of the meter-out restrictor is controlled according to the time rate of change of the angle. Therefore, even when the negative load acting on the hydraulic actuator changes, the deterioration in the operability is prevented and significant energy saving effect is achieved.

Further, according to the above-described first embodiment of the hydraulic control system for a construction machine according to the present invention, the opening area of the meter-out restrictor 23*a* is controlled according to the arm angle $\theta_A'$, the arm angular speed $\omega_A'$ as the time rate of change of the arm angle $\theta_A'$, and the arm crowding pilot pressure. Therefore, the breathing phenomenon when a negative load acts on the hydraulic actuator is prevented and significant energy saving effect is achieved.

Second Embodiment

Figure 8:
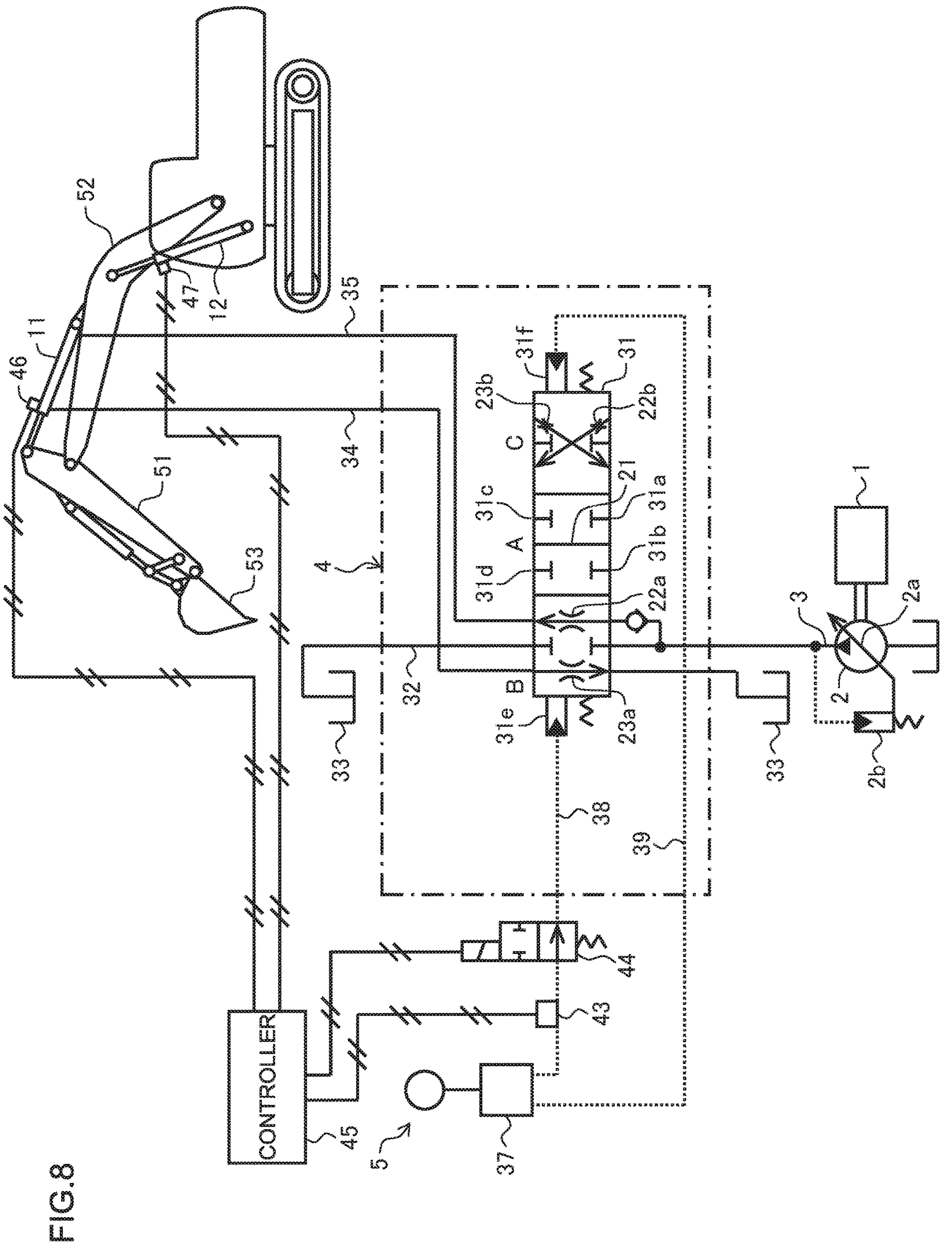
FIG. 8 is a diagram schematically showing a hydraulic circuit part related to the arm cylinder of a hydraulic excavator in a second embodiment of the hydraulic control system for a construction machine according to the present invention.
Figure 9:
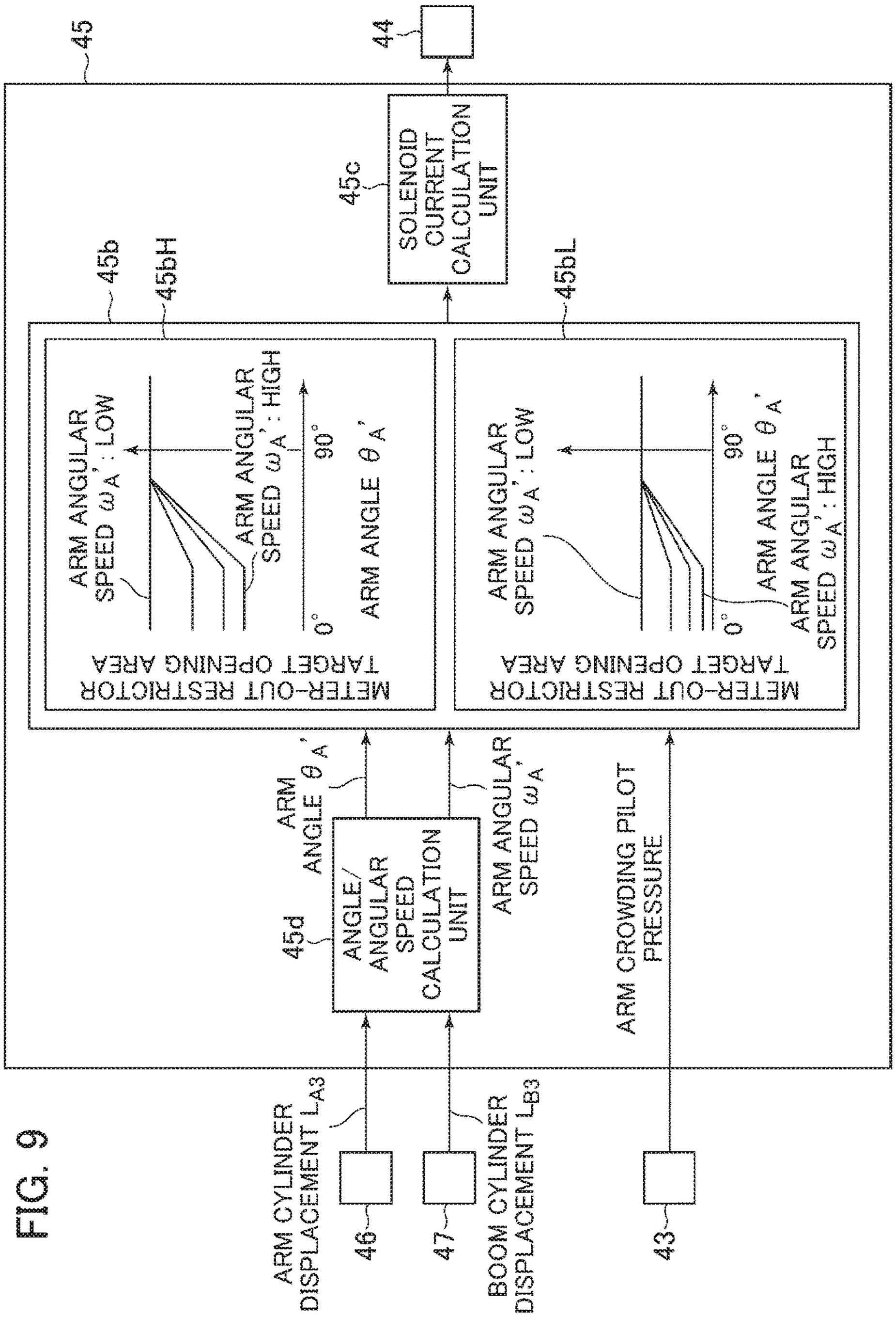
FIG. 9 is a functional block diagram showing the processing function of a controller constituting the second embodiment of the hydraulic control system for a construction machine according to the present invention.

A second embodiment of the hydraulic control system for a construction machine according to the present invention will be described below with reference to figures. FIG. 8 is a diagram schematically showing a hydraulic circuit part related to the arm cylinder of a hydraulic excavator in the second embodiment of the hydraulic control system for a construction machine according to the present invention. FIG. 9 is a functional block diagram showing the processing function of a controller constituting the second embodiment of the hydraulic control system for a construction machine according to the present invention. Reference characters in FIGS. 8 and 9 identical with those in FIGS. 1 to 7 represent components identical with those in FIGS. 1 to 7, and thus detailed explanation thereof is omitted here.

In the second embodiment of the hydraulic control system for a construction machine according to the present invention, the overall system of the hydraulic circuit and the control circuit is substantially equivalent to that in the first embodiment. The second embodiment differs from the first embodiment in that the hydraulic control system is not equipped with the arm angle sensor 41 or the boom angle sensor 42 but equipped with an arm cylinder displacement sensor 46 for detecting the amount of expansion/contraction of the rod of the arm cylinder 11 and a boom cylinder displacement sensor 47 for detecting the amount of expansion/contraction of the rod of the boom cylinder 12 in place of the arm angle sensor 41 and the boom angle sensor 42.

As shown in FIG. 8, the arm cylinder displacement sensor 46 is provided at an outer part of the arm cylinder 11, and the boom cylinder displacement sensor 47 is provided at an outer part of the boom cylinder 12. Displacement signals outputted from these displacement sensors 46 and 47 are inputted to the controller 45.

In the first embodiment, the arm angle $\theta_A'$ and the arm angular speed $\omega_A'$ are calculated based on the arm rotation angle $\theta_A$ and the boom rotation angle $\theta_B$ detected by the arm angle sensor 41 and the boom angle sensor 42 and the meter-out restrictor target opening area is calculated based on the arm angle $\theta_A'$, the arm angular speed $\omega_A'$ and the arm crowding pilot pressure. In contrast, a major feature of this embodiment is that the arm angle $\theta_A'$ and the arm angular speed $\omega_A'$ are calculated based on an arm cylinder displacement $L_{A3}$ and a boom cylinder displacement $L_{B3}$ detected by the arm cylinder displacement sensor 46 and the boom cylinder displacement sensor 47 and the meter-out restrictor target opening area is calculated based on the arm angle $\theta_A'$, the arm angular speed $\omega_A'$ and the arm crowding pilot pressure.

The controller 45 in this embodiment shown in FIG. 9 includes an angle/angular speed calculation unit 45*d* as the posture calculation unit, the meter-out opening calculation unit 45*b* as the meter-out opening area calculation unit, and the solenoid current calculation unit 45*c* as the meter-out control unit.

The angle/angular speed calculation unit 45*d* receives the arm cylinder displacement $L_{A3}$ detected by the arm cylinder displacement sensor 46 and the boom cylinder displacement $L_{B3}$ detected by the boom cylinder displacement sensor 47 and calculates the angle $\theta_A'$ made by the arm 51 with respect to the horizontal direction (hereinafter referred to also as an "arm angle") and the angular speed $\omega_A'$ of the rotation of the arm 51 (hereinafter referred to also as an "arm angular speed") from the values of the arm cylinder displacement $L_{A3}$ and the boom cylinder displacement $L_{B3}$.

Specifically, the arm angle $\theta_A'$ and the arm angular speed $\omega_A'$ are calculated respectively by using the expressions (1) and (2) in the first embodiment. The rotation angle $\theta_A$ of the arm 51 and the rotation angle $\theta_B$ of the boom 52 in the expressions (1) and (2) are calculated by using the following expressions (3) and (4):

$$\theta_A=\mathrm{COS}^{-1}((L_{A3}^2-L_{A1}^2-L_{A2}^2)/2L_{A1}L_{A2}) \quad (3)$$

$$\theta_B=\mathrm{COS}^{-1}((L_{B1}^2+L_{B2}^2-L_{B3}^2)/2L_{B1}L_{B2}) \quad (4)$$

where $L_{A1}$–$L_{A3}$ and $L_{B1}$–$L_{B3}$ represent the lengths of the components shown in FIG. 5.

In both of the tables of the meter-out opening calculation unit 45*b*, the characteristics are set so as to decrease the target opening area of the meter-out restrictor 23*a* with the increase in the arm angular speed $\omega_A'$ when the arm angle $\theta_A'$ is less than or equal to approximately 90°, that is, when a negative load acts on the arm cylinder 11, and to set the target opening area of the meter-out restrictor 23*a* at a maximum value irrespective of the arm angular speed $\omega_A'$ when the arm angle $\theta_A'$ is larger than or equal to approximately 90°, that is, when a positive load acts on the arm cylinder 11. While the selection is made from different tables based on the arm crowding pilot pressure as explained above, the number of the tables is not limited to two; the meter-out opening calculation unit 45*b* may also have a greater number of tables to make a still finer selection depending on the arm crowding pilot pressure. This configuration is equivalent to that in the first embodiment.

The solenoid current calculation unit 45*c* receives a signal representing the target opening area of the meter-out restrictor 23*a* calculated by the meter-out opening calculation unit 45*b*, calculates a solenoid current value corresponding to the value of the received signal, and outputs a control signal representing the calculated solenoid current value to the solenoid proportional valve 44. This configuration is equivalent to that in the first embodiment.

Also in this embodiment configured as above, effects similar to those of the first embodiment can be achieved by calculating the arm angle $\theta_A'$ and the arm angular speed $\omega_A'$ from the amounts of expansion/contraction of the arm cylinder 11 and the boom cylinder 12.

According to the above-described second embodiment of the hydraulic control system for a construction machine according to the present invention, effects similar to the aforementioned effects of the first embodiment can be achieved.

Incidentally, while the description of the embodiments of the present invention has been given by using examples of application of the present invention to the valve unit of the arm cylinder of a hydraulic excavator, the present invention is not limited to such examples. The present invention is similarly applicable also to valve units of hydraulic cylinders of a hydraulic excavator other than the arm cylinder or the bucket cylinder, or to valve units of hydraulic cylinders of construction machines other than hydraulic excavators, such as wheel loaders and cranes, as long as weight loads of various levels can act on each hydraulic cylinder.

What is claimed is:

1. A hydraulic control system for a construction machine, the hydraulic control system comprising:
- a hydraulic actuator that drives an arm with hydraulic fluid delivered from a hydraulic pump;
- a meter-out channel through which the hydraulic fluid discharged from the hydraulic actuator flows;
- a variable restrictor provided in the meter-out channel;
- an operating device that outputs an operation command signal for the hydraulic actuator according to an operation amount of the operating device; and
- a controller configured to control an opening area of the variable restrictor,
- wherein the controller is further configured to:
- calculate an arm angle made by the arm with respect to a horizontal direction,
- calculate a target opening area of the variable restrictor operation amount based on the arm angle and an arm angular speed which is a time rate of change of the arm angle,
- output a command signal to a solenoid valve used for adjusting the opening area of the variable restrictor based on the target opening area of the variable restrictor, and
- wherein the target opening area of the variable restrictor is calculated using a table whose characteristics are set so as to decrease the target opening area of the meter-out restrictor with an increase in the arm angular speed when the arm angle is less than or equal to 90 degrees.

2. The hydraulic control system for the construction machine according to claim 1, further comprising:
- an operation amount detecting device that detects the operation amount of the operating device,
- wherein the target opening area of the variable restrictor is calculated based on the arm angle and the arm angular speed in accordance with the detected operation amount of the operating device.

3. The hydraulic control system for the construction machine according to claim 1, wherein the construction machine further comprises:

a lower track structure, an upper swing structure swingably provided on the lower track structure, a front work implement of a multijoint type rotatably connected to the upper swing structure and including the arm and a boom, a boom angle sensor that detects a rotation angle of the boom with respect to the upper swing structure, and an arm angle sensor that detects a rotation angle of the arm with respect to the boom, and wherein the controller is further configured to calculate the arm angle based on the rotation angles detected by the boom angle sensor and the arm angle sensor.

4. The hydraulic control system for the construction machine according to claim 1, wherein the construction machine further comprises:

a lower track structure, an upper swing structure swingably provided on the lower track structure, a front work implement of a multijoint type rotatably connected to the upper swing structure and including the arm and a boom, a boom hydraulic cylinder for driving the boom, an arm hydraulic cylinder for driving the arm, a boom cylinder displacement sensor that detects displacement of the boom hydraulic cylinder, and an arm cylinder displacement sensor that detects displacement of the arm hydraulic cylinder, and wherein the controller is further configured to calculate the arm angle based on the displacements detected by the boom cylinder displacement sensor and the arm cylinder displacement sensor.

* * * * *